(12) United States Patent
Murphy et al.

(10) Patent No.: US 11,633,762 B2
(45) Date of Patent: Apr. 25, 2023

(54) ADJUSTABLE ROLL SIZER

(71) Applicant: Southern Fabrication Works, LLC, Burley, ID (US)

(72) Inventors: James Claude Murphy, Burley, ID (US); Michael Neil Justesen, Burley, ID (US)

(73) Assignee: SOUTHERN FABRICATION WORKS, LLC, Burley, ID (US)

( * ) Notice: Subject to any disclaimer, the term of this patent is extended or adjusted under 35 U.S.C. 154(b) by 0 days.

(21) Appl. No.: 17/353,714

(22) Filed: Jun. 21, 2021

(65) Prior Publication Data
US 2021/0394236 A1 Dec. 23, 2021

Related U.S. Application Data

(60) Provisional application No. 63/041,905, filed on Jun. 20, 2020.

(51) Int. Cl.
*B07B 1/15* (2006.01)
*B07B 1/14* (2006.01)
(52) U.S. Cl.
CPC .................................. *B07B 1/145* (2013.01)
(58) Field of Classification Search
CPC .......... B07B 1/145; B07B 1/4636; B07B 1/15
See application file for complete search history.

(56) References Cited

U.S. PATENT DOCUMENTS

| 2,425,478 | A | * | 8/1947 | Lawton | B07C 5/065 209/668 |
| 2007/0000823 | A1 | * | 1/2007 | Greenbank | B07B 1/15 209/621 |
| 2012/0193272 | A1 | * | 8/2012 | Greve | B07B 1/15 209/244 |
| 2021/0276046 | A1 | * | 9/2021 | Ströder | B07B 1/50 |

FOREIGN PATENT DOCUMENTS

CN 208627852 U * 3/2019
CN 209829485 U * 12/2019

OTHER PUBLICATIONS

Machine translation of CN208627852, retrieved from, https://patents.google.com/patent/CN208627852U/en?oq=CN208627852U on Oct. 27, 2022 (4 pages).

* cited by examiner

*Primary Examiner* — Patrick H Mackey
(74) *Attorney, Agent, or Firm* — Burdick Patents, P.A.; Sean Burdick (57) ABSTRACT

An adjustable roll sizer for sorting objects of different sizes includes a first set of rollers mounted to a support structure and arranged in a first parallel array. A second set of rollers is mounted to the support structure in a second parallel array that is interleaveably alignable with the first parallel array. Means for automatic control are provided for misaligning the second parallel array from the first parallel array to vary gap width between adjacent rollers. Each roller in the second parallel array may also be tapered to vary gap width as a function of roller length. Rollers may include helical ridges for urging objects along the gaps.

13 Claims, 7 Drawing Sheets

ADJUSTABLE ROLL SIZER

RELATED APPLICATIONS

This application claims priority to U.S. Provisional Application 63/041,905 that was filed Jun. 20, 2020 and which is fully incorporated herein by reference.

BACKGROUND OF THE INVENTION

Field of the Invention

The present invention relates generally to apparatus for sorting objects by size, and more specifically to apparatus for automatically sorting harvested vegetables by size that has an adjustable mechanism that sets sizes to be sorted.

Description of Related Art

Automated mechanisms for sorting objects by size are well known in the art. The most common mechanisms for sorting potatoes and other harvested vegetables utilize a roller conveyor, that is, a series of spaced-apart rollers set within a frame and arranged in parallel along a horizontal plane at a fixed elevation. Vegetables to be sorted are delivered to an entrance of the roller conveyor and a power source rotates the rollers so that the vegetables are urged in a direction perpendicular to the rollers. Spacing between adjacent rollers generally increases as the vegetables move further along the conveyor, so that smaller sized products fall through rollers nearer the entrance end, intermediate sized products fall through rollers at locations between the entrance and exit ends, and larger sized products fall through rollers nearer the exit end. That is, the larger the product, the farther it travels along the rollers until it falls through a gap. Bins or conveyor belts are located beneath the rollers to collect falling products of common size.

One drawback of the common roller conveyor is the difficulty adapting its configuration for different sorting criteria or for different types of products. In many cases, the position of each roller within the frame must be individually adjusted to achieve desired horizontal spacing. For products that have wide variations in size, adjustments must be made to roller spacings to accommodate a greater spectrum of widths. This can cause a change to the overall length of the roller conveyor, which then necessitates repositioning of the bins or conveyors that lie beneath the rollers for collecting falling products. Another drawback of common roller conveyors is the mechanism for driving the rollers, which usually includes a serpentine belt that must be woven around pulleys at a driven end of each roller. Installation, maintenance, and replacement of the serpentine belt, and cleaning of the individual rollers, are very time-consuming procedures.

What is needed is a more advanced mechanism for sorting products by size that improves overall efficiency when adapting the mechanism for sorting different size spectra.

SUMMARY OF THE INVENTION

The present invention advances the technology of apparatus and methods for sorting objects such as harvested vegetables by size. In general, the invention improves operational efficiency of mechanized sorting by providing a roll sizer that conveys objects to be sorted in an axial direction, that is, in a direction parallel to the rotational axes of the rollers. The invention also provides means for vertically adjusting the position of rollers to create gaps between adjacent rollers that vary spatially in the axial direction.

In one embodiment, an adjustable roll sizer according to the present invention includes a first set of rollers mounted to a support structure and arranged in a first parallel array. A second set of rollers is mounted to the support structure in a second parallel array that is interleaveably alignable with the first parallel array. Also provided is a means for misaligning the second parallel array from the first parallel array. Each roller in the first set may be horizontally displaced from one or more adjacent rollers in the first set. In addition, each roller in the first set may be rotatably mounted to the support structure so that the longitudinal axis of each roller is substantially parallel to the longitudinal axis of all other rollers of the first set.

Many variations on the invention are presented. For example, in the adjustable roll sizer, each roller in the second set may be driven by a different motor, while all of the rollers in the first set may be driven by a common motor. In another example, the means for misaligning the second parallel array of rollers from the first parallel array of rollers may utilize an electric or hydraulic actuator. In another embodiment, one or more rollers may be configured for conveying products in the axial direction by forming a helical ridge disposed along an outer surface of one or more of the rollers. In other embodiments, one or more rollers may be formed as a cylindrical shaft, or as a conical shaft, or may have a shaft portion that is formed as a cylindrical or conical shaft.

In another embodiment of the present invention, an adjustable roll sizer includes at least one fixed roller mounted to a support structure, wherein each fixed roller is rotatable about a fixed longitudinal axis. At least one pivoting roller is also provided, wherein the pivoting roller has a pivot end pivotally mounted to the support structure, and an actuator end opposite the pivot end. Also provided is an actuator that is coupled to the actuator end of the pivoting roller. The actuator is configured to cause the pivoting roller to pivot about the pivot end in a plane parallel to the fixed longitudinal axis.

As a system, the adjustable roll sizer is configured to cause the pivoting roller(s) to pivot into positions into and out of parallel alignment with the fixed roller(s). That is, the adjustable roll sizer is configured so that the pivoting roller(s) are each rotatable about a pivotable longitudinal axis, and the actuator is configured to cause the pivoting roller(s) to pivot into a position of parallel alignment with the fixed roller(s) by aligning the pivotable longitudinal axis of the pivoting roller(s) substantially in parallel with the fixed longitudinal axes.

In any embodiment herein, the adjustable roll sizer may be configured to define a longitudinal gap of non-constant dimension between a fixed roller and an adjacent pivoting roller when the pivoting roller is positioned in parallel alignment with the fixed roller. Also in any embodiment herein, the adjustable roll sizer may be configured to define a longitudinal gap of constant dimension between a fixed roller and an adjacent pivoting roller when the pivoting roller is positioned in non-parallel alignment with the fixed roller. In any embodiment herein, a fixed roller may be longitudinally rotatably mounted to the support structure. Also in any embodiment herein, a pivoting roller may be longitudinally rotatably mounted to the support structure.

Other embodiments of the present invention include variations on the particular form of the fixed and pivoting rollers. For example, in some embodiments, a fixed roller may have an outer surface that is smooth along an entire length of the outer surface. In another example, a pivoting roller may be rotatable about a pivotable longitudinal axis, and the pivoting roller may have an outer surface and a means formed on the outer surface for urging objects in a longitudinal direction when the pivoting roller rotates about the pivotable longitudinal axis. The means for urging objects may be a helix or helical ridge formed on the outer surface of the pivoting roller. In other embodiments, a fixed roller or a pivoting roller may have a form that is generally longitudinally tapered.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The present invention advances the technology of apparatus and methods for sorting objects such as harvested vegetables by size. In general, the invention improves operational efficiency of mechanized sorting by providing a roll sizer that conveys objects to be sorted in an axial direction, that is, in a direction parallel to the rotational axes of the rollers. The invention also provides means for vertically adjusting the position of rollers to create gap widths between adjacent rollers that vary spatially in the axial direction. All components shown and described herein must be suitable for use in an industrial application such as the harvesting and processing of agricultural produce. Accordingly, component parts should be formed from rigid and robust materials such metal such as aluminum or steel, and from other materials commonly used in the construction of electric and hydraulic actuators.

Figure 1:
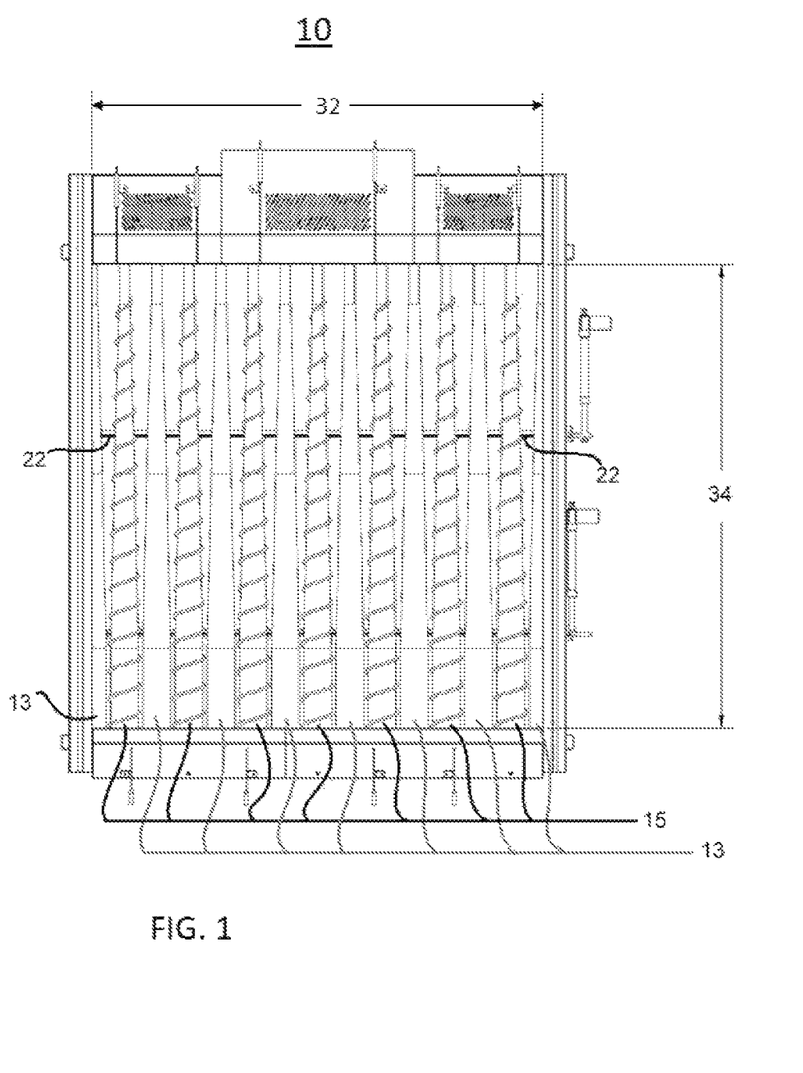
FIG. 1 is a top view of one embodiment of an adjustable roll sizer according to the invention.

FIG. 1 shows a top view of one embodiment of an adjustable roll sizer 10 according to the present invention. The roll sizer 10 includes a first set of rollers and a second set of rollers, all of which are mounted to a support structure 11. The first set of rollers includes only the rollers 13 and the second set of rollers includes only the rollers 15. The rollers 13 are arranged in a first parallel array, while the rollers 15 are arranged in a second parallel array that is interleaved with the first parallel array. In other words, among all rollers 13 and 15 installed in roll sizer 10, every other roller is a roller 13, or one could say that every roller 13 lies between a pair of rollers 15. Accordingly, the second parallel array of rollers 15 is interleaveably aligned, or interleaveably alignable, with the first parallel array of rollers 13.

Figure 2:
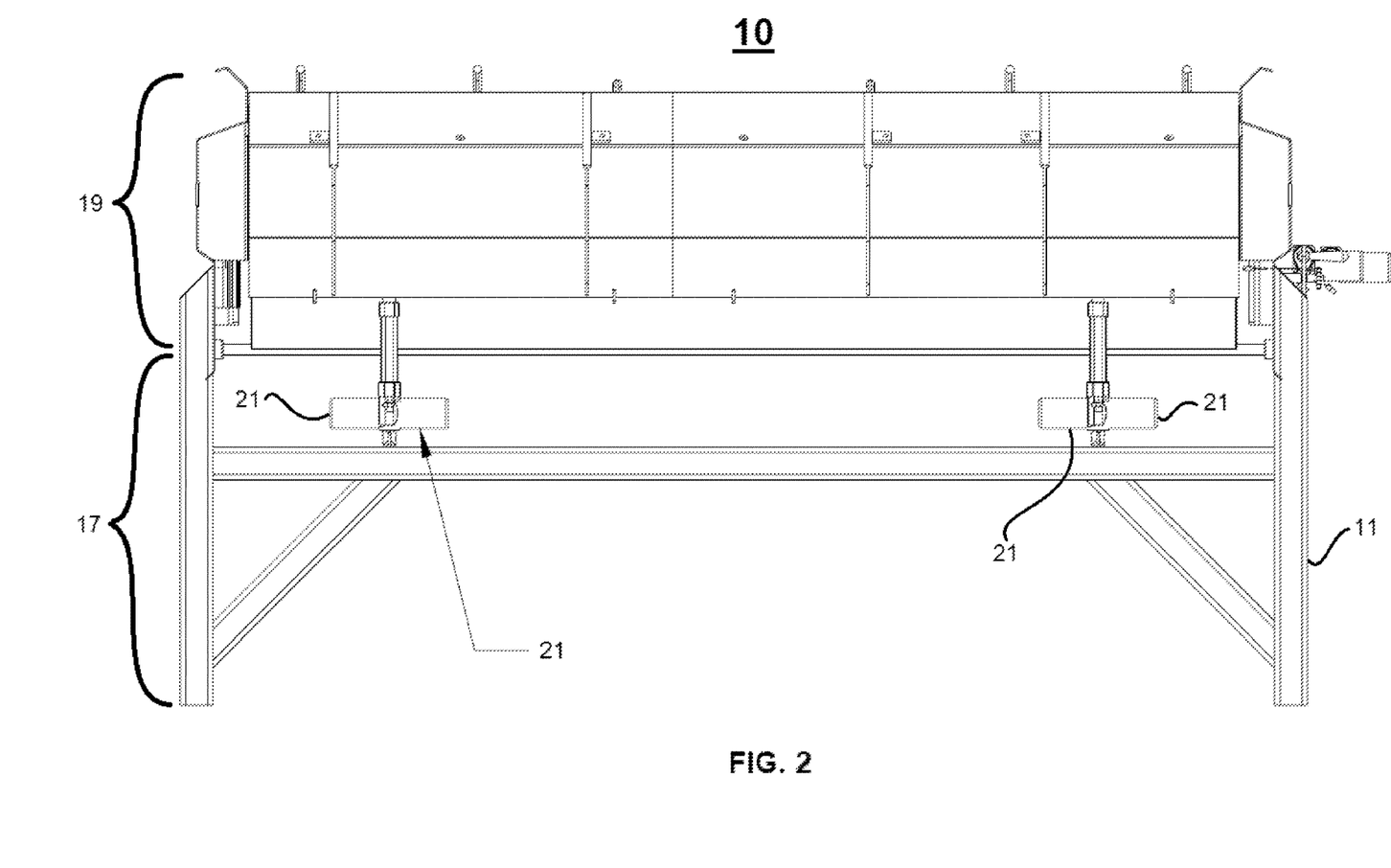
FIG. 2 is a front end view of the embodiment of FIG. 1.

FIG. 2 shows a front end view of the roll sizer 10. More components of the support structure 11 are shown in this view. Support structure 11 consists generally of a lower portion 17 and an upper portion 19. The purpose of the lower portion 17 is to provide a stable foundation for supporting and elevating the upper portion 17 of the roll sizer 10. The upper portion 17 includes mechanical structures for supporting the rollers 13 and 15, and for supporting means for rotating and actuating the rollers 13 or 15, as needed. The lower portion 17 also creates sufficient clearance beneath the upper portion 19 and the ground beneath the lower portion 17 to allow product collection devices such as bins or conveyors to collect products sorted by the rollers 13 and 15 as those products fall between gaps in the rollers during operation of the roll sizer 10.

FIG. 2 also shows four electric actuators 21, which illustrate one possible embodiment means for positioning the rollers 15 into alignment or misalignment with a roller 13. Other embodiments of such actuating means include hydraulic and pneumatic motors, and also manually driven components such as lever arms that can raise and lower the rollers 15 to different elevations, for example, by engaging the lever arm within any one of a series of vertically spaced notches in the support structure 11 according to known methods. Any non-manually operated actuator 21 may be remotely operated to raise and lower the rollers 15, to any desired height within the range of the actuator, to align or misalign the second parallel array of rollers 15 with respect to the first parallel array of rollers 13.

As used herein, to align one roller 15 with a roller 13 means that longitudinal axis of the roller 15 is positioned substantially parallel to and substantially at the same elevation as the longitudinal axis of the roller 13. According to the invention, rollers 13, 15 described herein are either generally cylindrical or generally conical in form, and thus the longitudinal axis of each such roller is understood to mean an imaginary straight line at the center of a cross-sectioned circle of the cylinder or cone, that extends through the entire length of the roller. Accordingly, to align a parallel array of rollers 15 to an array of rollers 13 means that the rollers 15 in the array of rollers 15 are parallel with respect to one another, that the rollers 13 in the array of rollers 13 are parallel with respect to one another, and that each roller 15 has been positioned in parallel with and at the same elevation as any and all of the rollers 13. Conversely, for one roller 15 to be misaligned with one or more other rollers 13 means that the roller 15 is either not parallel to the one or more rollers 13, or the roller 15 is parallel to the one or more rollers 13 but is offset from the one or more rollers 13 at a different elevation.

Figure 3:
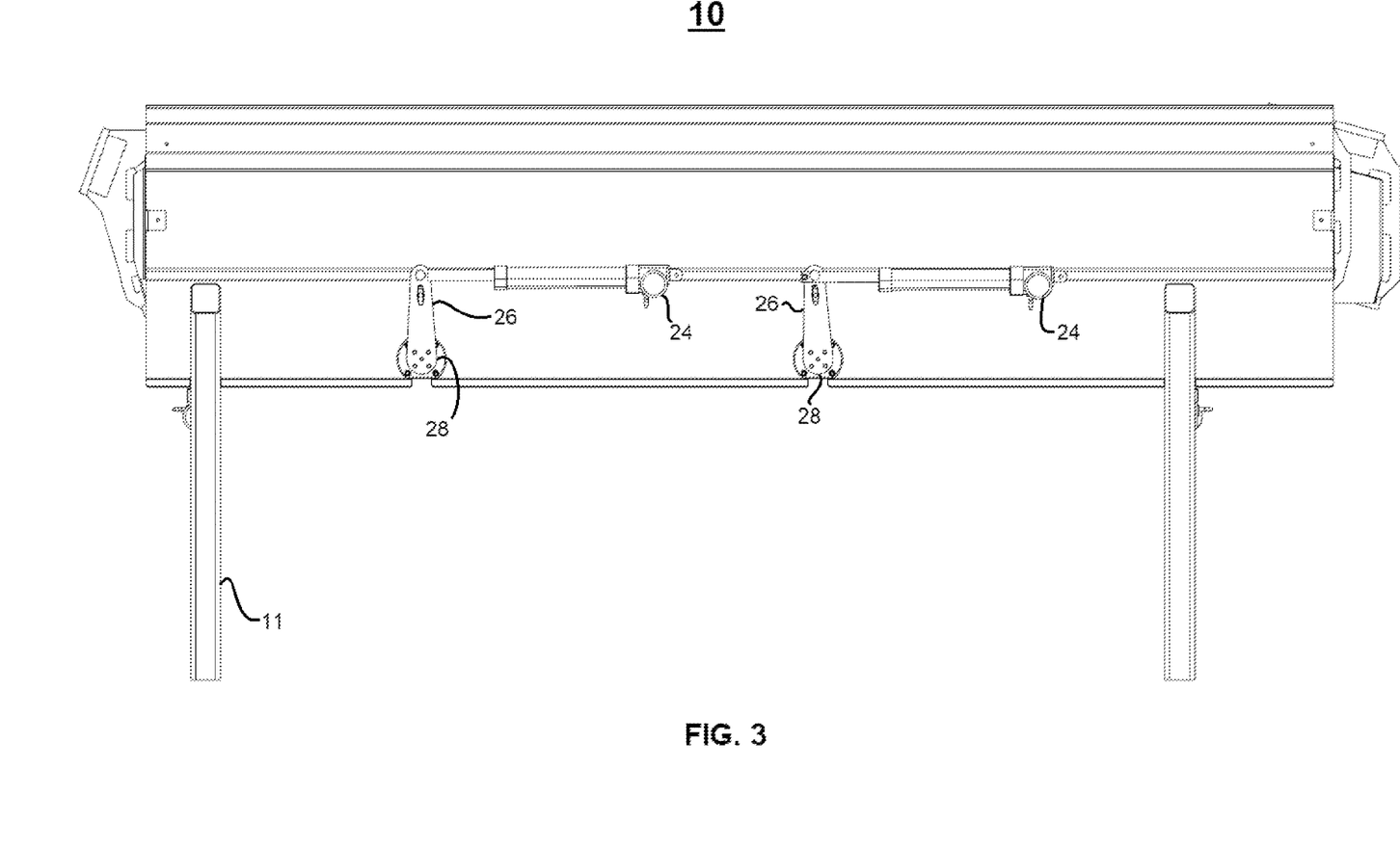
FIG. 3 is a right side view of the embodiment of FIG. 1.

FIG. 3 is a right side view of the roll sizer 10. This view illustrates the presence and operation of one or more gates 22 that may be installed on a roll sizer 10 in optional embodiments of the invention. A single gate 22 is shown in the figure for illustrative purposes only; however, multiple gates and gate actuators may be installed on a roll sizer according to the invention. Each gate 22 provides an opening beneath the upper portion 19 of the roll sizer 10 to direct the passage of products that fall through gaps in the rollers. Each gate 22 thereby assists in the sorting and transfer of products to a particular bin or conveyor belt dedicated for collecting a particular size or size range of products. For example, each gate 22 may include a sloped shelf or chute for directing the products. In one implementation, the gate 22 includes a motor 24, a rotating arm 26, and a pivot 28. Motor 24 may be a linear motor, or an electric rotary motor coupled for linear actuation, or a hydraulic or pneumatic motor. Whatever its form, motor 24 is configured to cause fine adjustment of the position of the gate 22. In one embodiment, motor 24 may be coupled to drive the rotating arm 26 in a clockwise or counterclockwise rotational direction about an axis defined through the pivot 28, as shown. The ability to redirect product as it falls through gaps in the rollers provides the operator with the ability to distribute product loads as desired as loading conditions change during processing.

Figure 4:
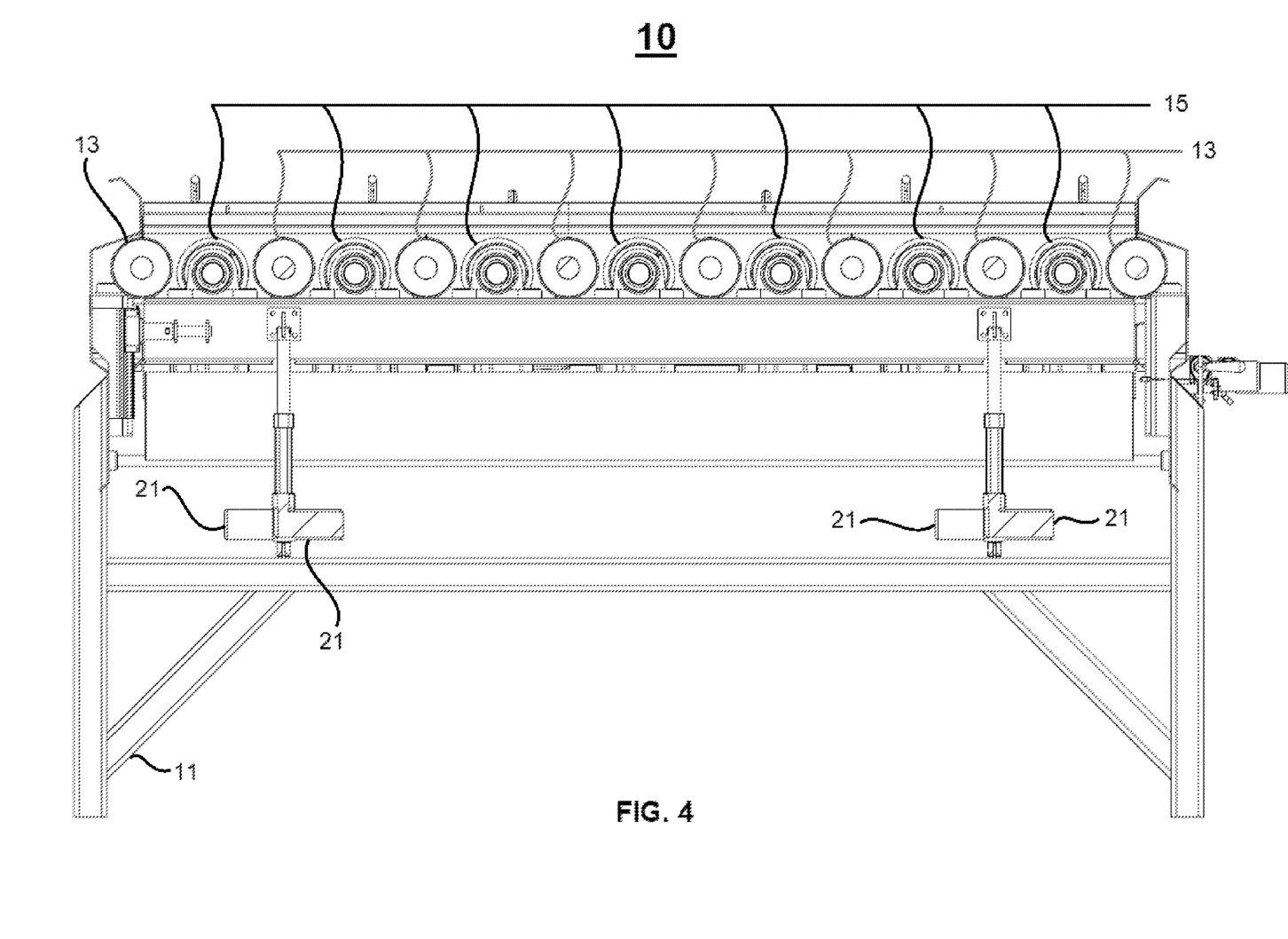
FIG. 4 is a rear end view of the embodiment of FIG. 1, showing actuators in an extended position.

FIG. 4 is a rear end view of the roll sizer 10, showing actuators 21 in an extended position. In the extended position, all of the rollers 15 have been raised into parallel alignment with the first array of rollers 13. Equivalently, the second parallel array of rollers 15 has been placed into parallel alignment with the first parallel array of rollers 13. To achieve this position, each roller 15 is mechanically coupled to one or more of the actuators 21, which can be controlled remotely by the operator.

Figure 5:
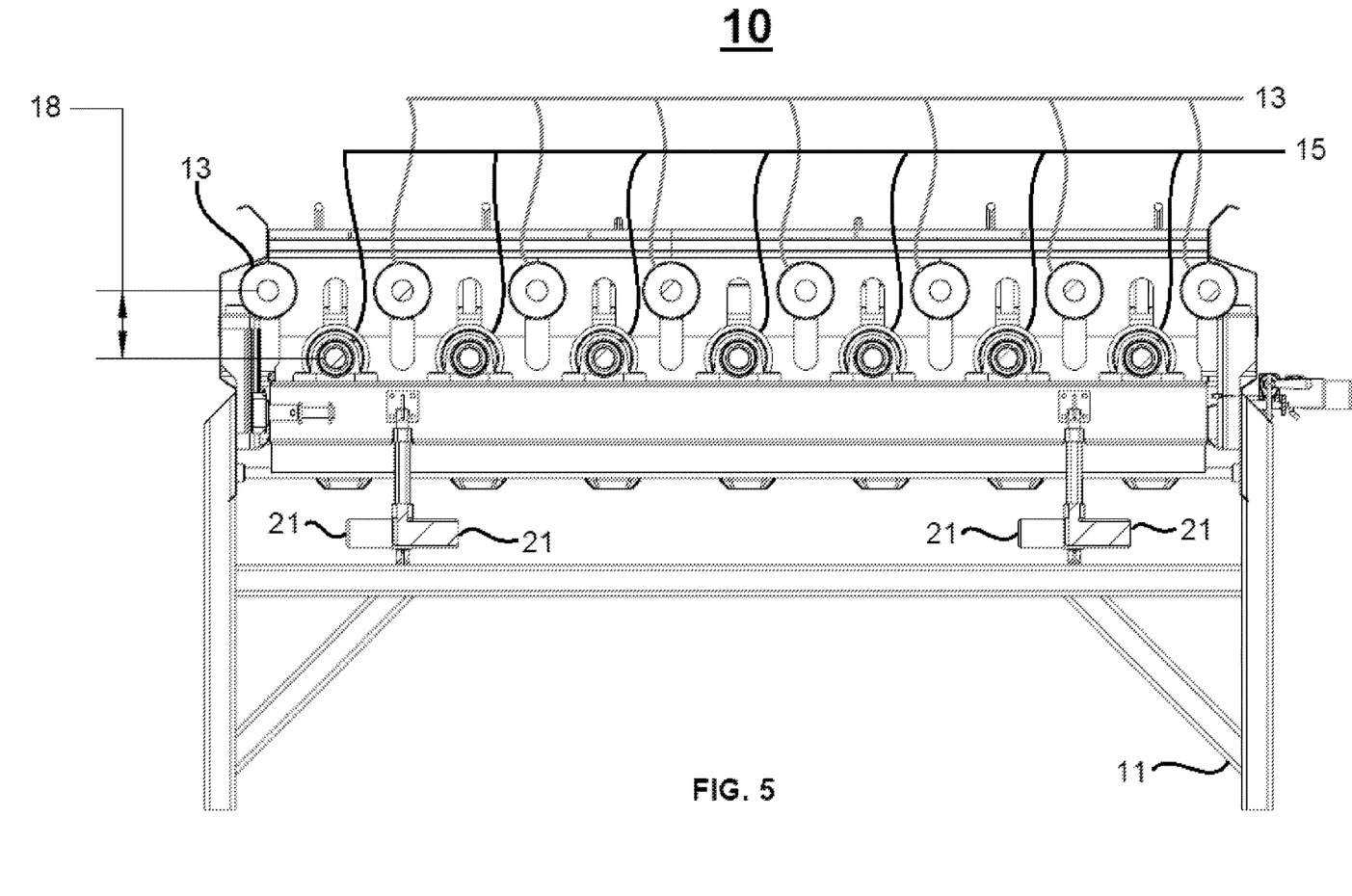
FIG. 5 is a rear end view of the embodiment of FIG. 1, showing actuators in a retracted position.

FIG. 5 is a rear end view of the roll sizer 10, showing actuators 21 in a retracted position. In the retracted position, all of the rollers 15 are parallel with the array of rollers 13 but have been lowered into misalignment with the array of rollers 13. Equivalently, the second parallel array of rollers 15 has been misaligned with respect to the first parallel array of rollers 13 by a vertical offset. Misalignment of the array of rollers 15 with respect to the array of rollers 13 may be measured by an offset distance 18. The offset 18 is the maximum vertical displacement between a longitudinal axis of roller 13 and a longitudinal axis of a roller 15. Different vertical offsets 18, and different positions of alignment and misalignment of the rollers 15 with respect to rollers 13 are customizable according to the invention and can be achieved by remote control. In one embodiment, these offsets and positions may be preset using a remote controller programmed to energize and deenergize the actuators 21 at any point in their stroke to achieve a desired configuration.

Figure 6:
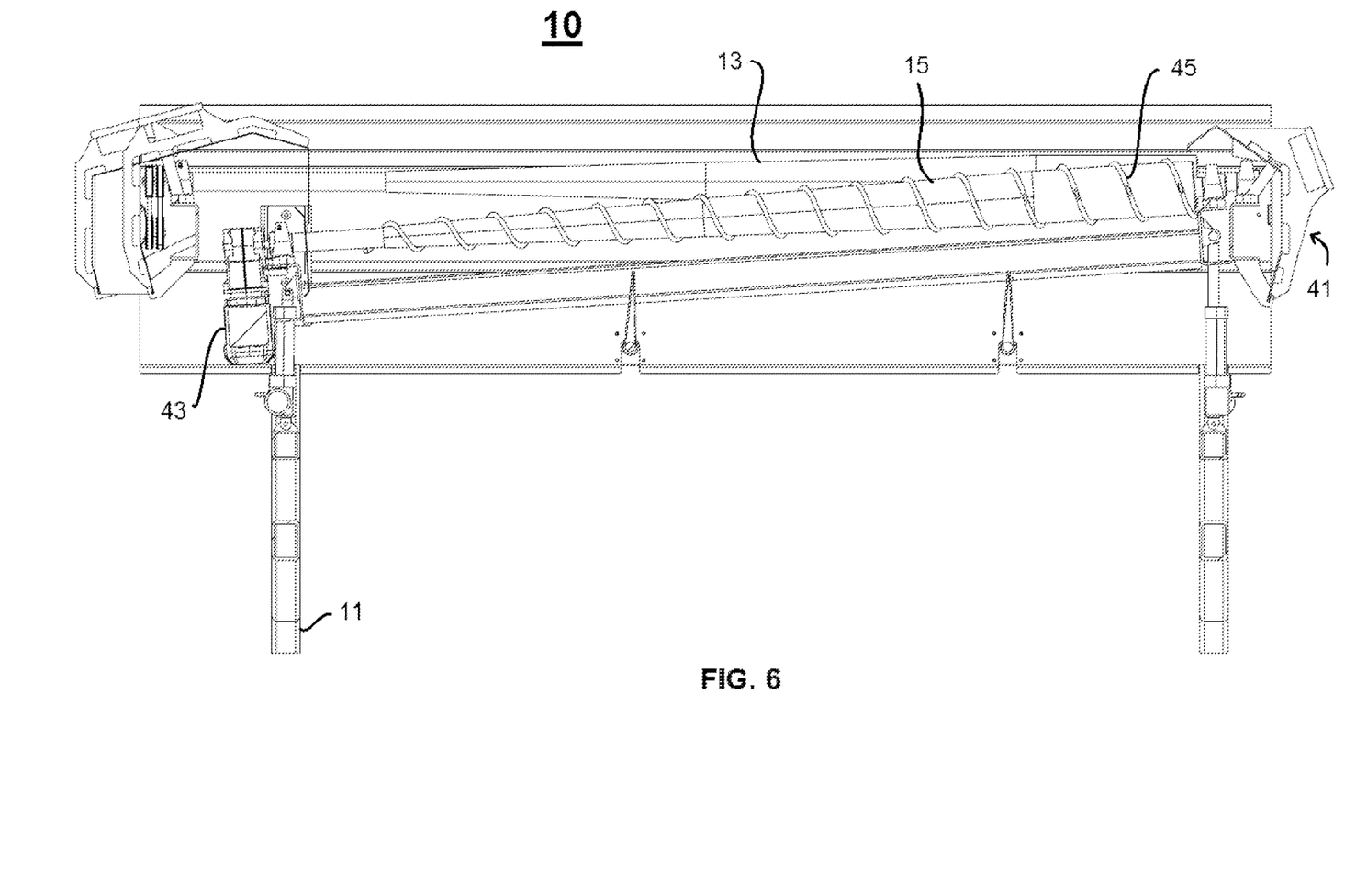
FIG. 6 is a cutaway left side view of the embodiment of FIG. 1 showing an actuator retracted at only one end of the roll sizer.

FIG. 6 shows a cutaway left side view of the roll sizer 10 with an actuator retracted at only one end of the roll sizer. For example, while the rear end of the roll sizer has been retracted at the mounting location of motor 43, the front end 41 of the roll sizer has remained set to its fully extended position. In this condition, the rollers 15 are misaligned with respect to the rollers 13, and have been set at a constant angle with respect to the horizontal plane defined by the axes of the rollers 13. This configuration creates a gap width between any pair of adjacent rollers 13 and 15 that increases with longitudinal distance along the rollers from the front end 41 toward the rear end at motor 43. A roller 15 thereby provides a pivoting roller having a pivot end at 41, and the pivoting end of the roller 15 is pivotally mounted to the support structure 11. Opposite the pivoting end of the roller 15 is the actuator end where the roller 15 is coupled to a vertical actuator 21 that when actuated causes the roller 15 to pivot about the pivot end in a plane parallel to the longitudinal axis of a roller 13. Moreover, the aforesaid configuration provides a pivoting roller 15 that is rotatable about a pivotable longitudinal axis, i.e. the axis of roller 15. The vertical actuator 21 is configured to cause the at least one pivoting roller 15 to pivot into a position of parallel alignment with a fixed roller 13 by aligning the pivotable longitudinal axis of the pivoting roller 15 substantially in parallel with a fixed longitudinal axis of the roller 13.

Figure 7:
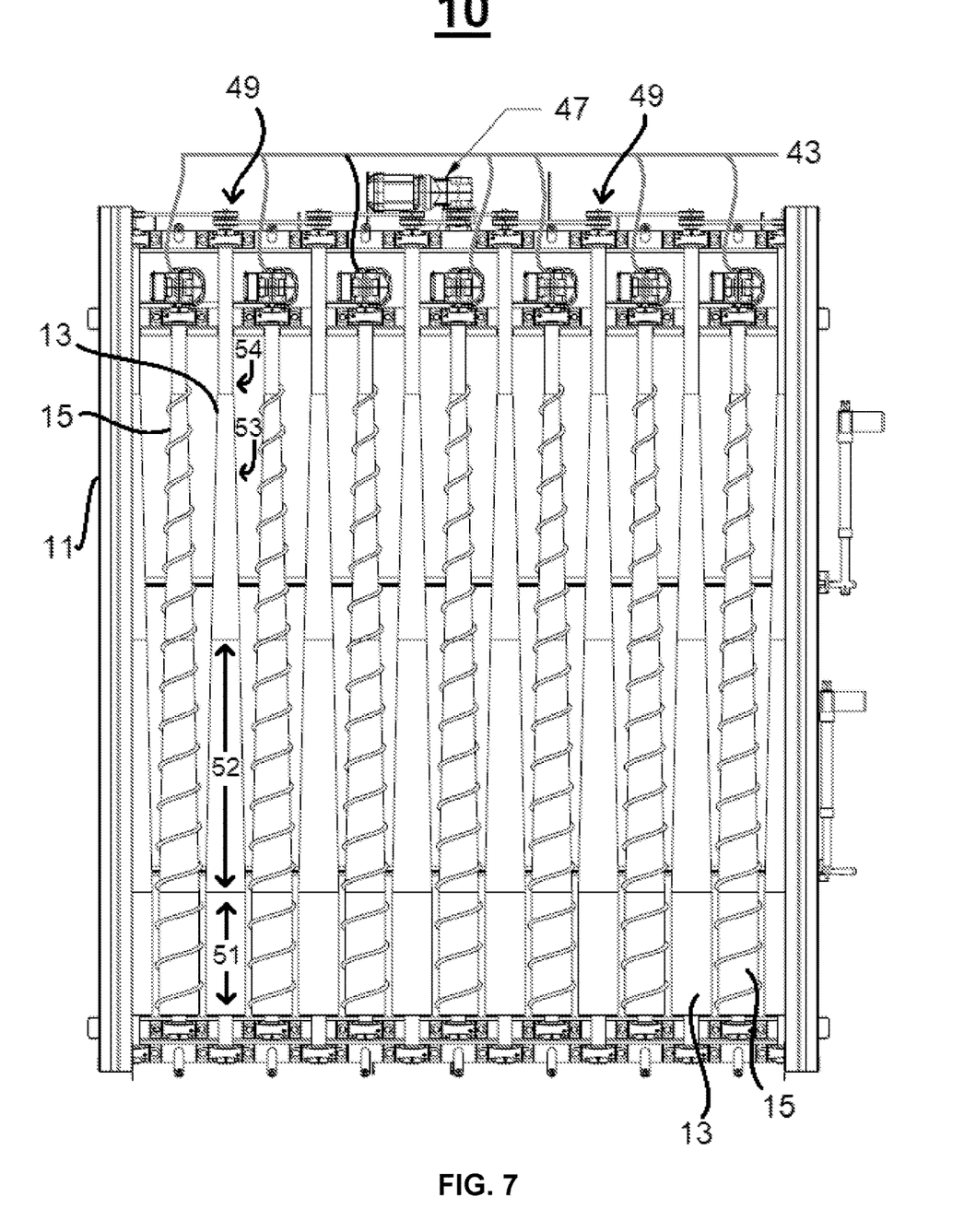
FIG. 7 is a top view of the embodiment of FIG. 1, showing guards removed.

FIG. 7 is a top view of the roll sizer 10, showing some components removed for ease of illustration. In this exemplary embodiment, the rotation of each roller 15 may be independently controlled, as each roller 15 is coupled to its own dedicated motor 43. In one embodiment, each motor 43 may be a ¼ hp electric motor. The rotation of the rollers 13, however, may be controlled simultaneously by a single motor 47, which is mechanically coupled to all of the rollers 13 by a pulley-and-belt system 49. In one embodiment, motor 47 may be a ¼ hp motor. In other embodiments, each roller 13 may also be independently controlled by dedicated motors, or all rollers 15 may be simultaneously controlled by a single motor.

FIG. 7 also illustrates an embodiment of the present invention in which all rollers 13 are fixed in elevation and form a stationary set of rollers. Moreover, all rollers 13 have a smooth surface along the entire length of the roller. Moreover, each roller 13 may possess one or more of the following features: a first cylindrical portion 51, a first conical portion 52, a second conical portion 53, and a second cylindrical portion 54. The first cylindrical portion 51 and the second cylindrical portion 54 may be formed at opposite ends of the roller 13. The first conical portion 52 and the second conical portion 53 may be directly coupled to one another between the first cylindrical portion 51 and the second cylindrical portion 54. The diameter of the first cylindrical portion 51 may be greater than the average diameter of the first conical portion 52. The average diameter of the first conical portion 52 may be greater than the average diameter of the second conical portion 53. The average diameter of the second conical portion 53 may be greater than the diameter of the second cylindrical portion 54. In another embodiment, at least one roller 13 comprises a cylinder of constant diameter along its entire length.

The shape of each roller 15 may also be configured according any of the shapes described in the previous paragraph for a roller 13. In the embodiment of FIG. 7, each roller 15 is shown having at least one conical portion along its length, and generally having a tapered form along its length. In an embodiment of a roll sizer 10 wherein each roller 13 is stationary and has cylindrical form, wherein each roller 15 has conical form, and wherein all rollers are placed in parallel alignment, a gap size between any pair of adjacent rollers 13 and 15 increases with longitudinal distance along the rollers from the rear end 41 toward the front end at motors 43. Further misalignment of rollers 15 can be selected by an operator to adjust the gap size as a function of longitudinal distance or vertical offset, or both.

In another embodiment of the invention, one or more of the rollers 13 or 15 may include a means for conveying products placed atop adjacent rollers in a longitudinal direction, i.e. in a direction parallel to the longitudinal axes of the rollers fixed in a horizontal plane. One example of a means for conveying products in this manner is a helical ridge disposed along an outer surface of one or more of the rollers. In the example shown in FIG. 7, each of the rollers 15 is configured with such a helical ridge, and each of the rollers 13 is configured with a smooth surface. Looking from the bottom of the page toward the top of the page (front to rear), when each roller 15 is rotated in a clockwise direction, the configuration of each helix will urge objects in a longitudinal direction toward the rear end of the roll sizer 10. Other embodiments for conveying means are possible within the scope of the invention. For example, one or more rollers 15 may be formed with spiral surfaces, and interleaved between cylindrical rollers or other spiral rollers so that when the rollers are rotated, the spiral surfaces urge product along the rollers.

An adjustable roll sizer according to the invention as described in the various embodiments herein is suitable for sorting a wide variety of products and advantageously provides sizing adjustability not present in conventional roll sizers. The invention is well-suited for sorting harvested produce such as potatoes, bell peppers, onions, egg plant, turnips, cabbage, melons, etc. The invention may be used to sort fish, nuts, rocks, packaged products, or any other objects in need of sorting by size. The invention may be scaled as necessary for different classes of products or objects.

In operation, a roll sizer 10 according to the invention sorts products by size, by introducing the products onto the roll sizer at the front end, where the gap between adjacent rollers is minimum. As products are urged toward the rear end of the roll sizer, smaller products fall through the gap nearer the front end while larger products are conveyed closer to the rear end before falling through the widening gap. The gap width is variable in the longitudinal direction, due to the conical shape of rollers, and/or due to a degree of misalignment of a first array of rollers with respect to a second array of rollers, as selected by an operator. Because the products are urged in a direction parallel to the longitudinal axes of the rollers, products can be sorted by adjustable gap sizes that are not separated by roller widths, as in conventional roll sizers. The roll sizer of the present invention thereby improves the processing speed for sorting. The table below illustrates throughput values achieved by different sizes of roll sizers 10 operated at 60 Hz to sort potatoes in experimental processing performed by the inventors.

| LANES | FLOW RATE |
|---|---|
| 4 lane (5-roll) | 25,000 lbs/hr |
| 6 lane (7-roll) | 40,000 lbs/hr |
| 8 lane (9-roll) | 55,000 lbs/hr |
| 10 lane (11-roll) | 70,000 lbs/hr |
| 12 lane (13-roll) | 85,000 lbs/hr |
| 14 lane (15-roll) | 100,000 lbs/hr |

In the table above, the size of each roll sizer 10 is determined according to the number of sorting lanes, where each lane consists of the gap between any two adjacent rolls. For example, as shown in FIG. 1, roll sizer 10 is a 14-lane roll sizer, and the width 32 and depth 34 will vary according to gap sizes, roller sizes, and the number of sorting lanes.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An adjustable roll sizer, comprising:
   a first set of rollers mounted to a support structure and arranged in a first parallel array, each roller in the first set defining a longitudinal axis and rotatable thereabout;
   a second set of rollers mounted to the support structure in a second parallel array that is interleaveably alignable with the first parallel array, each roller in the second set defining a longitudinal axis and rotatable thereabout;
   a means for misaligning the second parallel array from the first parallel array; and
   at least one motor coupled to at least one roller from the first set of rollers or from the second set of rollers and configured to cause the at least one roller to rotate about the longitudinal axis of the at least one roller synchronously with rotation of the motor.

2. The adjustable roll sizer of claim 1 wherein the first set of rollers is rotatably mounted to the support structure.

3. The adjustable roll sizer of claim 1 wherein each roller in the first set is horizontally displaced from one or more adjacent rollers in the first set.

4. The adjustable roll sizer of claim 1 wherein each roller in the first set has a longitudinal axis of rotation and wherein each roller in the first set is rotatably mounted to the support structure so that the longitudinal axis of each roller is substantially parallel to the longitudinal axis of all other rollers of the first set.

5. The adjustable roll sizer of claim 1 wherein the at least one motor is coupled to the at least one roller from the first set of rollers and wherein each roller in the second set of rollers is driven by a motor different from the at least one motor.

6. The adjustable roll sizer of claim 1 wherein all of the rollers in the first set are driven by the at least one motor.

7. The adjustable roll sizer of claim 1 wherein the misaligning means comprises an electric or hydraulic actuator.

8. The adjustable roll sizer of claim 1 further comprising a means for conveying products placed atop adjacent rollers in a direction parallel to the first parallel array.

9. The adjustable roll sizer of claim 8 wherein the means for conveying products comprises a helical ridge disposed along an outer surface of at least one roller in the second set of rollers.

10. The adjustable roll sizer of claim 1 wherein at least one roller in the first set of rollers comprises a conical shaft.

11. The adjustable roll sizer of claim 1 wherein at least one roller in the second set of rollers comprises a conical shaft.

12. The adjustable roll sizer of claim 1 wherein the at least one fixed roller is longitudinally tapered.

13. The adjustable roll sizer of claim 1 wherein the at least one pivoting roller is longitudinally tapered.

* * * * *